3 Sheets—Sheet 3.
A. MILLER.
CLOVER-HULLER.
No. 188,064. Patented March 6, 1877.
FIG. 9
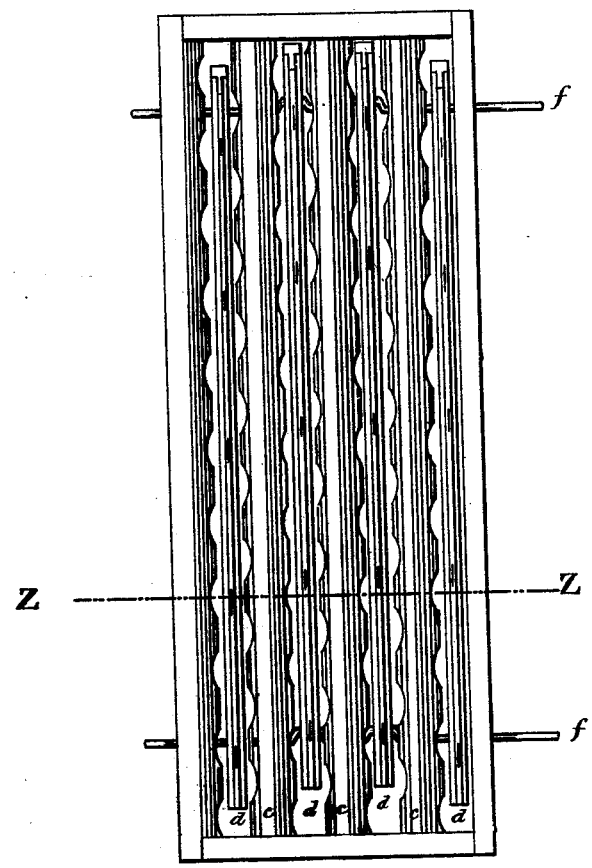
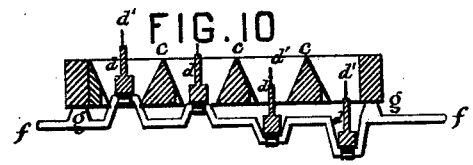
FIG. 10
ATTEST: INVENTOR.
Abraham Miller

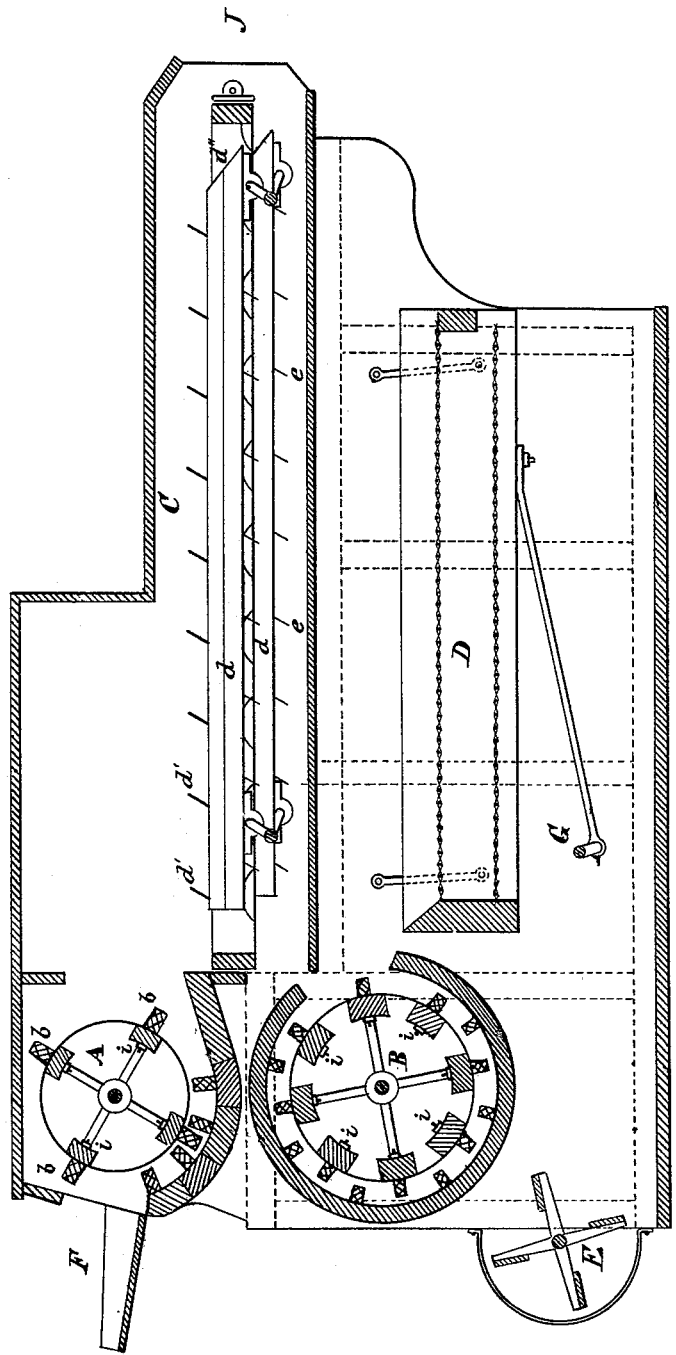

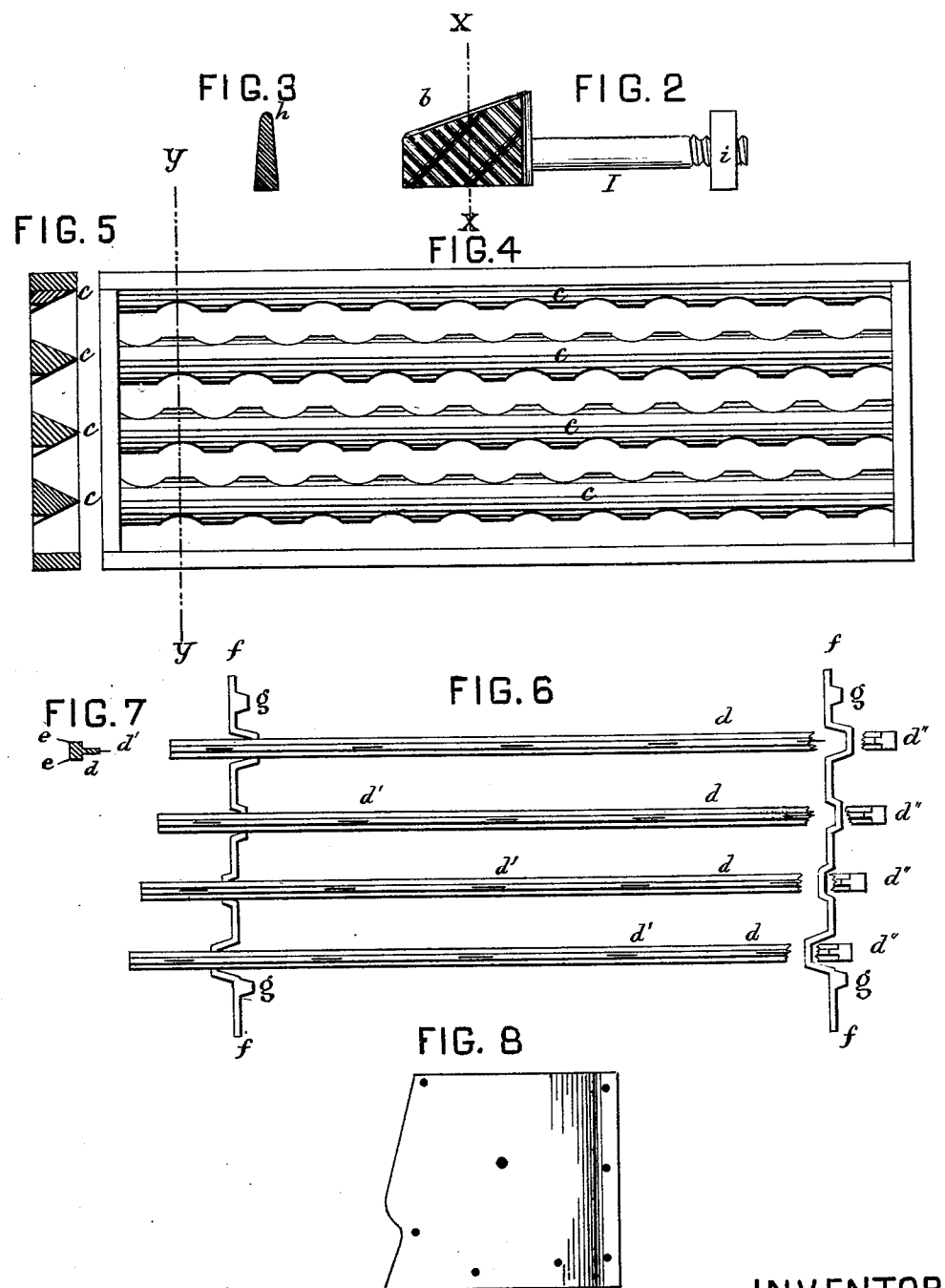

UNITED STATES PATENT OFFICE.

ABRAHAM MILLER, OF HAGERSTOWN, MARYLAND, ASSIGNOR TO HAGERSTOWN AGRICULTURAL IMPLEMENT MANUFACTURING COMPANY, OF SAME PLACE.

IMPROVEMENT IN CLOVER-HULLERS.

Specification forming part of Letters Patent No. 188,054, dated March 6, 1877; application filed February 19, 1877.

*To all whom it may concern:*

Be it known that I, ABRAHAM MILLER, of Hagerstown, in Washington county, Maryland, have invented certain Improvements on Clover-Hullers, of which the following is a specification:

My invention relates to clover-hullers, and consists more particularly in the use of two hulling-cylinders, of a peculiar construction, in one machine; also, in so combining a rake with said two cylinders that as the clover is delivered from the upper cylinder the coarser material is separated from the pods and partially-hulled seed, and thrown out at the end of the machine, while the pods and seed are carried to the lower cylinder, where the hulling of the seed is completed; also, in the peculiar construction of the upper and lower cylinders; also, in the peculiar construction of the rake above mentioned; also, in the construction of the rubbers, so that the pods are separated from the heads and the seed hulled by a rubbing action, without breaking the seed; also, in several mechanical details, which will be fully described when I describe the machine represented in the drawings.

Figure 1 is a vertical longitudinal section of a machine containing my improvements. Fig. 2 is a side view of one of the rubbers and its shank and nut. Fig. 3 is a section through line X X, Fig. 2, showing the general shape of the rubber. Fig. 4 is a plan of the rake-bed. Fig. 5 is an inverted section of the same through y y, Fig. 4. Fig. 6 is a plan of the rake. Fig. 7 is an inverted section of a rake-bar. Fig. 8 is one of the metal sides of the upper concave. Fig. 9 is a plan of the rake-bed, with rakes in position. Fig. 10 is a section of same, taken through Z Z, Fig. 9.

A is the first or upper hulling-cylinder. It is an open cylinder, having four arms or beaters, to which the rubbers *b* are attached by shank and nut. The concave of this first cylinder contains several sections or rows of rubbers, generally four, so as to be capable not only of rubbing to pieces the ball of clover, but also of hulling out considerable of the seed. The concave is carried around well under the cylinder.

The rubbers, Fig. 2, are provided with shanks I and nuts *i*, by which they are attached to the cylinders and concaves. The cylinders being open, the rubbers are easily removed and replaced, and if a rubber become worn or injured any ordinary operator can put another in its place. The shank and nut also prevent the rubbers flying out and breaking the machine. The rubbers are made thicker at the back than at the front, and the front edge is rounded, as shown at *h*, Fig. 3, so that they will not break the clover, but will rub the pods from the heads and the seed from the pods. The sides of the rubbers, in the form I prefer, are fluted or roughened in a peculiar way, as seen in Fig. 2, to increase their efficiency.

B is the second or lower hulling cylinder. These have heretofore been made in the form of a solid or closed cylinder. I make it open, with beaters having the rubbers attached by shank and nut, so as to be readily removed. As this cylinder has to hull the seed from the tougher pods, which pass through the upper concave unhulled, it and its concave have a greater number of rows of rubbers, so as to give a greater rubbing-surface. I generally extend the concave nearly around the cylinder, as seen in Fig. 1. The rubbers in each row in this lower cylinder and concave I generally place slightly farther apart than in the upper cylinder and concave, so as to avoid any danger of breaking the seed. As it has my peculiarly-formed rubbers with rounded front edges in both cylinder and concave, and as they are generally placed so as to run a little farther apart than in the upper hulling-cylinder and concave, it results that the seed hulled out above passes around this cylinder without injury, while the tough unhulled pods that were not sufficiently acted upon above in passing the entire circuit of this cylinder will be rubbed by every line of rubbers, and thus thoroughly hulled.

In machines before mine, where none of the hulling is done above, but the first cylinder is simply a thrashing-cylinder, so much stuff comes into the huller that it very poorly performs its work, and much of the clover is carried off in the tailings and has to be fed through the machine again. I avoid this by making my cylinders as above described.

It is true that machines have been made before having two hulling-cylinders on one machine, but they had not my peculiar rubbers; and, again, they had no arrangement combined with them to take off the coarse stuff, so as to prevent it from going into the lower cylinder. To take away all this coarse stuff that is separated from the seed and unhulled pods in the passage between the first cylinder and concave, I have combined with my cylinders a peculiar rake that carries this stuff out of the machine, and that pushes back to the second cylinder the seed and unhulled pods.

Some of the features of this device were shown in my patent of September 27, 1864, granted to Jones and Miller; but as here used I have much improved it to fit it for its peculiar use of carefully taking away the coarse stuff from the discharge of the first cylinder, and without any clogging, removing it freely and immediately from the machine, so as to prevent any of it from working its way to the second cylinder; also, regularly feeding the second cylinder from the seed and unhulled pods.

C is the rake, composed of rake proper, Figs. 6 and 7, and rake-bed, Figs. 4 and 5. The rake-bed is composed of a number of bars, $c\ c\ c\ c$, having their upper edges beveled off, as shown in Figs. 5 and 10, so as to afford no place for the lodgment of seed, &c., as would be the case were the bars otherwise constructed. The bars are notched at intervals, as shown. The rake proper is also composed of a number of bars, $d\ d\ d\ d$, there being one to each space in the rake-bed. The raker-bars are in section of an inverted T shape, which permits of the bars $c\ c$ being wider, and the space between them and the raker-bars narrower than if otherwise made. The outer ends $d''$ of the raker-bars are beveled off to prevent clogging. Upon the upper end of each raker-bar is a row of teeth, $d'$, projecting upward and forward, and upon the lower edge there are two rows of teeth, $e\ e$, projecting downward and backward to rake the pods and seed back to the lower cylinder B.

The raker-bars are given an upward and forward and a downward and backward motion by means of cranked shafts $f\ f$, the crank being at different angles on the shafts, and of such throw that during the forward motion of the bars the teeth $d'$ project above the bars $c\ c$, and carry the material, which is supported thereon, forward, and during the back motion of the bars the teeth $d'$ are below the surface of the rake-bed, and the teeth $e\ e$ act upon the material below, and carry back to the lower cylinder.

$g\ g$ are projections or cams upon the crank-shafts, for the purpose of jarring the rake-bed, so as to more perfectly separate the pods and partially-hulled seed from the coarser material, the said pods and seed passing through the rake-bed, and being carried back, while the coarser material is carried forward and thrown out at J. By placing the projections $g\ g$ at an angle to each other, the rake-bed will experience a slight side jar, which will be more effective. F, Fig. 1, is a feed-board, by which the clover is fed into the machine. The sides of the upper concave are of metal, (see Fig. 8,) so that they can support the boxes for the cylinder, and also the concave, and to receive the ends of the separator. From the lower cylinder the hulled seed and chaff are delivered onto screens D, where, with the aid of a current of air from the fan E, the seed and chaff are separated. The screens are shaken by a crank, G. The machine is driven by power applied to the various moving parts by belts in the usual manner.

Having thus described my improvements, and a machine embodying them, I claim—

1. The combination, in one machine, of two cylinders fitted with rubbers, substantially as and for the purposes described.

2. The combination, in one machine, of the open upper cylinder with the open lower cylinder, substantially as and for the purposes described.

3. The combination, in one machine, of the open upper cylinder, fitted with a small number of rubbers, with the open lower cylinder, fittted with a large number of rubbers, substantially as and for the purposes described.

4. The combination, in one machine, of two cylinders fitted with rubbers, and the separator or rake C, substantially as and for the purposes described.

5. The separator or rake C, formed by combining the bars $c\ c\ c\ c$, made with upper beveled edges, and the raker-bars $d\ d\ d\ d$, made in the form of an inverted T, substantially as and for the purposes described.

6. The raker-bars $d\ d\ d\ d$, constructed in the form of an inverted T, substantially as and for the purposes described.

7. The raker-bars when beveled on their outer ends, substantially as shown and described.

8. In combination with the raker-bed, the projections or knockers $g\ g$ on the raker-shafts $f\ f$, for the purpose of jarring the rake-bed, substantially as set forth.

9. In combination with a hulling cylinder, the rubbers $b\ b$, having roughened sides and rounded front edges $h$, substantially as and for the purpose specified.

10. In combination with an open lower cylinder, the rubbers having shanks I and nuts $i$, for the purpose described.

11. A rubber having its back thicker than its front, and its front edge rounded and smooth, substantially as and for the purpose specified.

ABRAHAM MILLER.

Attest:
CHAS. J. KNODLE,
J. P. APPLEMAN.